United States Patent
Reuber et al.

(10) Patent No.: US 10,062,526 B2
(45) Date of Patent: Aug. 28, 2018

(54) MEDIUM VOLTAGE SWITCHGEAR WITH INTERLOCKING DEVICE CORRESPONDING WITH THE SWITCHING DRIVE

(71) Applicant: ABB Technology AG, Zurich (CH)

(72) Inventors: Christian Reuber, Willich (DE); Philipp Masmeier, Duesseldorf (DE)

(73) Assignee: ABB Schweiz AG, Baden (CH)

( * ) Notice: Subject to any disclaimer, the term of this patent is extended or adjusted under 35 U.S.C. 154(b) by 36 days.

(21) Appl. No.: 14/744,609

(22) Filed: Jun. 19, 2015

(65) Prior Publication Data

US 2015/0294812 A1 Oct. 15, 2015

Related U.S. Application Data

(63) Continuation of application No. PCT/EP2013/003827, filed on Dec. 18, 2013.

(30) Foreign Application Priority Data

Dec. 19, 2012 (EP) .................................. 12008460

(51) Int. Cl.
*H01H 9/20* (2006.01)
*H01H 9/22* (2006.01)
(Continued)

(52) U.S. Cl.
CPC .................. *H01H 9/22* (2013.01); *H02B 1/38* (2013.01); *H02B 11/127* (2013.01)

(58) Field of Classification Search
CPC ........... H01H 9/22; H02B 1/38; H02B 11/127
(Continued)

(56) References Cited

U.S. PATENT DOCUMENTS 1,910,686 A * 5/1933 Frank ...................... H01H 9/26
                                                                 200/50.19
2,344,636 A   3/1944 Quast
(Continued)

FOREIGN PATENT DOCUMENTS

EP    0 226 532 A2    6/1987
EP    0 278 984 A1    8/1988
EP    0 567 415 A1    10/1993

OTHER PUBLICATIONS

International Search Report (PCT/ISA/210) dated Mar. 13, 2014, by the European Patent Office as the International Searching Authority for International Application No. PCT/EP2013/003827.
(Continued)

*Primary Examiner* — Edwin A. Leon
*Assistant Examiner* — Lheiren Mae A Caroc
(74) *Attorney, Agent, or Firm* — J. Bruce Schelkopf; Taft Stettinius & Hollister LLP

(57) ABSTRACT

Exemplary embodiments relate to a medium voltage switchgear with interlocking device associated with an actuator drive, which operates a switching element via a mechanical coupling element. The switching drive is movable in two end positions until which the interlocking is active between a freely selectable middle position and a specified end position. In order to keep the interlocking active over a certain range of the actuator travel, the mechanical coupling element includes a force flux element that is rotatable during operation of the drive from OFF to ON. In this way, the region where the interlocking shifts from unlocked to locked can freely be chosen by the shape of the force flux element.

1 Claim, 3 Drawing Sheets

(51) Int. Cl.
 *H02B 1/38* (2006.01)
 *H02B 11/127* (2006.01)
(58) Field of Classification Search
 USPC ......... 200/50.19, 50.09, 50.01–50.06, 50.12,
 200/50.18
 See application file for complete search history.

(56) References Cited

U.S. PATENT DOCUMENTS

| | | | |
|---|---|---|---|
| 2,695,934 | A | 11/1954 | Wills |
| 2,739,002 | A | 3/1956 | Johnson |
| 4,754,367 | A | 6/1988 | Bohnen |
| 4,860,161 | A | 8/1989 | Maki et al. |
| 5,334,808 | A | 8/1994 | Bur et al. |
| 7,429,708 | B1 * | 9/2008 | Poyner ................... H01H 9/168 |
| | | | 200/334 |
| 2007/0029178 | A1 | 2/2007 | Mukharzi et al. |

OTHER PUBLICATIONS

Written Opinion (PCT/ISA/237) dated Mar. 13, 2014, by the European Patent Office as the International Searching Authority for International Application No. PCT/EP2013/003827.
Search Report dated May 24, 2013, by the European Patent Office for Application No. 12008460.3.

\* cited by examiner

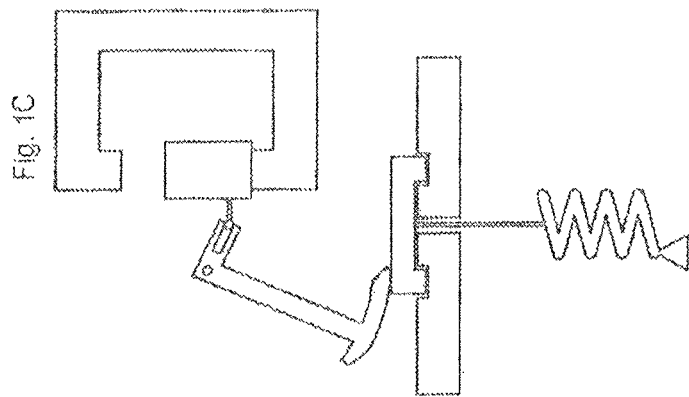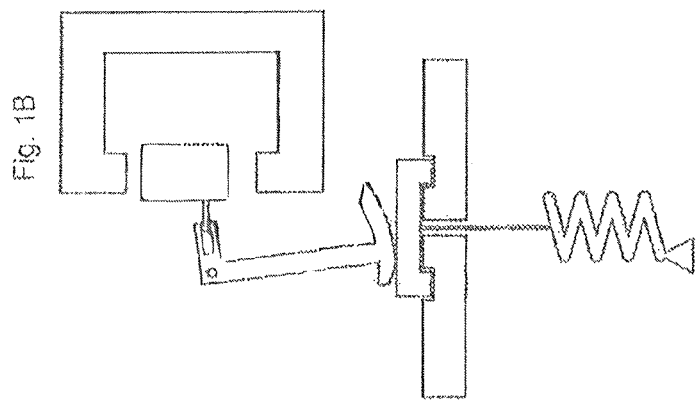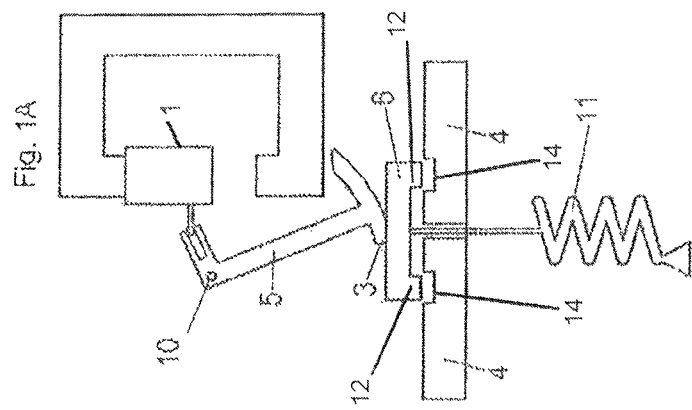

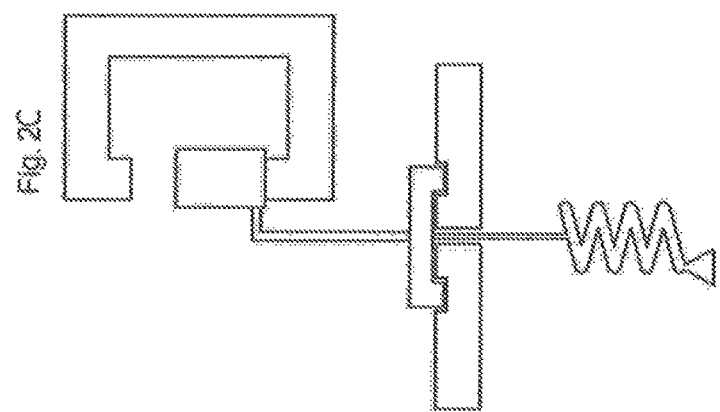
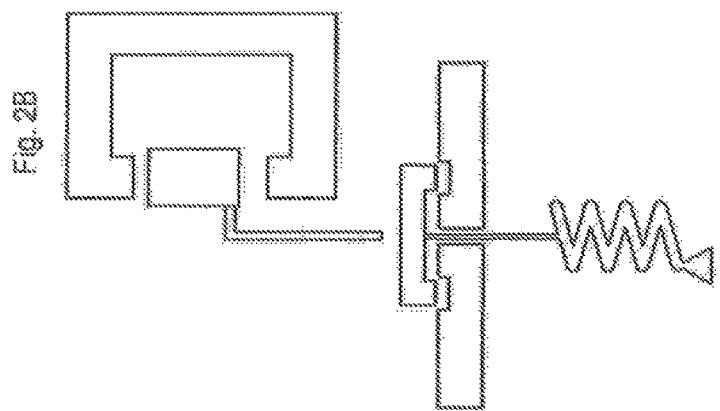
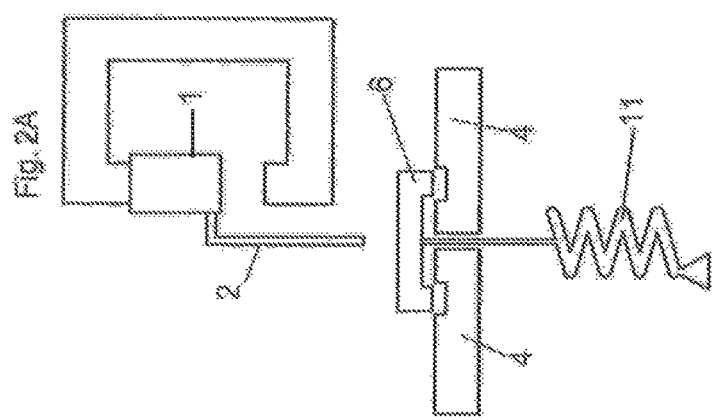

MEDIUM VOLTAGE SWITCHGEAR WITH INTERLOCKING DEVICE CORRESPONDING WITH THE SWITCHING DRIVE

RELATED APPLICATION(S)

This application claims priority under 35 U.S.C. § 119 to International application PCT/EP2013/003827 filed on Dec. 18, 2013, designates the U.S., and claims priority to European application 12008460.3 filed on Dec. 19, 2012. The content of each prior application is hereby incorporated by reference in its entirety.

FIELD

The present disclosure relates to a medium voltage switchgear with interlocking device corresponding with the switching drive, wherein the switching drive operates a switching element via a mechanical coupling element.

BACKGROUND INFORMATION

A known mechanical arrangement includes an actuator, a rod, and a movable interlocking device as well as a cabinet. In this known arrangement, the rod is fixed to the actuator and moving with it during an operation. The interlocking device is held down by the rod, when the actuator is in a specified position (in this case the lower position), so the cabinet is locked. When the actuator moves up, the rod is released from the interlocking device, so the cabinet is unlocked.

Because the rod is fixed to the actuator and directly heading to the interlocking device, the interlocking function is only working, when the rod is directly touching the interlocking device. This might be a disadvantage, when the interlocking function is needed over a certain range of the actuator-travel. It may lead to an insecure situation, when the actuator stops in another position than its dedicated end-positions (mid position). This mid position is undesired, however possible as a result of a malfunction.

SUMMARY

An exemplary medium voltage switchgear is disclosed, comprising: an interlocking device associated with an actuator drive, which operates a switching element via a mechanical coupling element, wherein the switching drive is movable in two end positions wherein the interlocking device is movable between a locked and an unlocked position, wherein a direction of motion of the actuator drive matches a direction of motion of the interlocking device, and wherein the mechanical coupling element includes a force flux element which is rotatable during operation of the drive from OFF to ON such that a region where the interlocking shifts from unlocked to locked can freely be chosen by a shape of said force flux element.

BRIEF DESCRIPTION OF THE DRAWINGS

The exemplary embodiments will be further described, by way of example only, with reference to the drawings, in which:

FIGS. 1A-C show the interlocking device in a lower position for the same status of the actuator and the interlocking function is active in accordance with an exemplary embodiment of the present disclosure;

FIG. 1A shows an upper position of the actuator 1 and an upper position of the interlocking device 6;

FIG. 1B shows an intermediate position of the actuator 1 and a lower position of the interlocking device 6;

FIG. 1C shows a lower position of the actuator 1 and the lower position of the interlocking device 6;

FIGS. 2A-C illustrate, the interlocking device is in its upper position when the actuator is in an intermediate position, and the interlocking function is not active in accordance with an exemplary embodiment of the present disclosure;

FIG. 2A shows an upper position of the actuator 1 and an upper position of the interlocking device 6;

FIG. 2B shows an intermediate position of the actuator 1 and the upper position of the interlocking device 6;

FIG. 2C shows a lower position of the actuator 1 and a lower position of the interlocking device 6.

DETAILED DESCRIPTION

Figure 3:
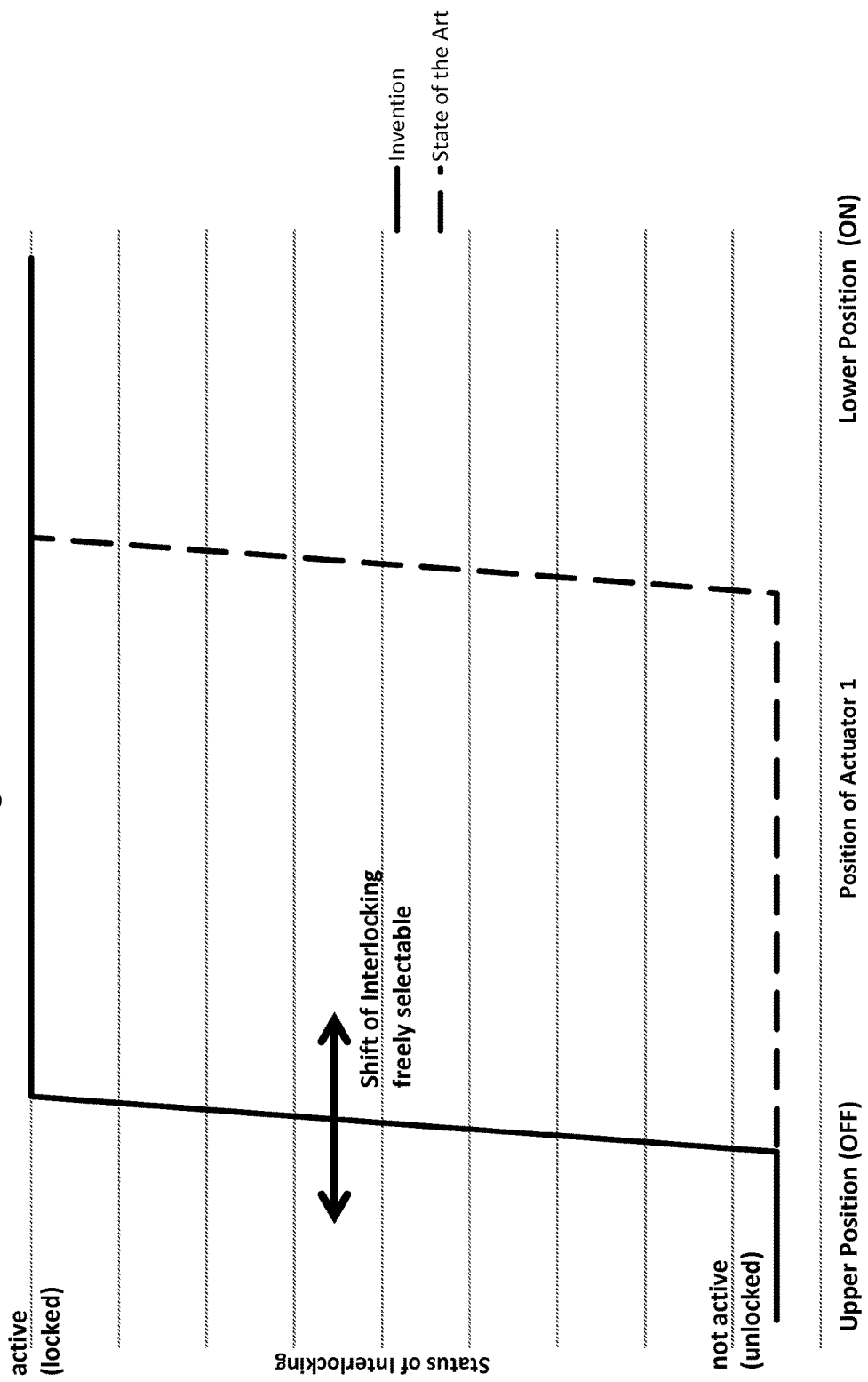
FIG. 3 illustrates a relationship between the interlocking device and the rod in accordance with an exemplary embodiment of the present disclosure.

Exemplary embodiments of the present disclosure are directed to keeping the interlocking active over a certain range of the actuator travel, in a way that the shift point where this interlocking is active and where this interlocking is not active can be freely chosen.

For example, according to an exemplary embodiment of the present disclosure the mechanical coupling element includes a force flux element which is rotatable during operation of the drive from OFF to ON in that way, that the region where the interlocking shifts from unlocked to locked can freely be chosen by the shape of said force flux element.

The issue here is that the given direction of motion of the actuator 1, up and down, and the given direction of motion and the given upper and lower positions of the interlocking device 6 allow for an active interlocking when the actuator is in, or very close to, the lower position.

It is not possible to freely choose a certain shift point of the position of the actuator where the interlocking function changes from not active to active when the position of the actuator is further lowered.

In comparison to embodiments disclosed, for example, in US 2007/0029178 (for example, FIG. 7), exemplary embodiments of the present disclosure provide a shift point where the status of the interlocking function changes from active to not active, dependent on the position of the actuating device, can freely be chosen (ON—A . . . E—OFF), because the motion of the actuating device (rotating around axis 5) is already in a suitable direction.

This is not the case in the present application due to the given constraints of the direction of motion of the actuator 1 and the given upper and lower position of the interlocking device 6. It is not possible to achieve an activated interlocking function for example, in the mid position of the actuator.

According to an exemplary embodiment of the present disclosure, the definition of the two end positions and a middle position is not in the meaning of a three position switch. The middle position is a defined position until which the interlocking device remains active, dependent for which end position the drive actually started the movement.

According to another exemplary embodiment of the present disclosure, the interlocking remains active in the middle position, so that it is prevented, that the interlocking function is only active in the defined lower end position.

According to an exemplary embodiment disclosed herein, the rotation of the force flux element according to the motion of the actuator 1 results in a mechanical interlocking, which remains active along the actuator travel between the lower end position and the middle position.

The disadvantages of the prior art are solved by the exemplary embodiments, which include mechanical coupling element having a force flux element 5 which can rotate around an axis 10.

FIG. 1 shows the interlocking device in a lower position for the same status of the actuator and the interlocking function is active in accordance with an exemplary embodiment of the present disclosure. As shown in FIG. 1, the force flux element is rotated according to the motion of the actuator 1 in that way that the shift point where the interlocking function shifts from active to non-active can freely be chosen by the shape 3 of the lower part of the force flux element. This shape 3 is a constant radius around the axis 10 where the interlocking function shall be active. In the region where the interlocking function shall be not active, the element 5 is shortened so that the interlocking device 6 can come to its upper position, for example by help of the spring 11, where the lateral motion of the sliders 4 is released. As shown in FIGS. 1A-C, the protrusions 12 of the interlocking device 6 and the recesses 14 of the sliders 4 are released in the unlocked position of FIG. 1A to allow lateral motion of the sliders 4 and are engaged in the locked position of FIGS. 1B-C.

According to an exemplary embodiment of present disclosure, an additional interlocking element (element 5) that transforms the available motion (for example, linear motion of the actuator 1) in another motion (for example, rotation) that can be used for an interlocking function with a freely selectable shift point (realized here by the shape 3 of the surface of the element 5).

FIG. 2 illustrates the interlocking device is in its upper position when the actuator is in an intermediate position, and the interlocking function is not active in accordance with an exemplary embodiment of the present disclosure. FIG. 2 shows the drive or actuator 1, the rod 2, the interlocking device 6 and the sliders 4 that are representing the interlocking function of the cabinet. The interlocking function is active—or locked—when the interlocking device 6 is pushed by the rod 2 towards its lower position where the movement of the sliders 4 to the left and to the right is blocked. The interlocking function is not active—or unlocked—when the interlocking device 6 is pushed by the spring 11 towards its upper position, where the movement of the sliders 4 to the left and to the right is released. Rod 2 cannot block the interlocking device 6 from being pushed towards its upper position.

FIG. 3 illustrates a relationship between the interlocking device and the rod in accordance with an exemplary embodiment of the present disclosure. In the prior art designs, the status of the interlocking shifts from unlocked to locked in the vicinity of the ON position of the actuator.

In comparison, exemplary embodiments of the present disclosure permit the shifting point to move freely between the ON and OFF position of the actuator so that for example the interlocking is only unlocked in the vicinity of the OFF position of the actuator.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A medium voltage switchgear with an interlocking device and a slider for locking and unlocking a cabinet, and an actuator drive which operates a switching element, wherein the actuator drive is movable between two end positions wherein the interlocking device is movable between a locked and an unlocked position, wherein the cabinet is locked in the locked position and unlocked in the unlocked position, the interlocking device and slider comprising a mating protrusion and recess, the protrusion and recess being engaged in the locked position and being released in the unlocked position to allow lateral motion of the slider, wherein the direction of motion of the actuator drive is the same as the direction of motion of the interlocking device, wherein a force flux element is rotatable during operation of the actuator drive from OFF to ON such that a region where the interlocking device shifts from the unlocked to locked positions is determined by a shape of said force flux element, characterized in that the force flux element rotates around an axis, and a shape of a lower part of the force flux element follows a constant radius around the axis where the interlocking device is in the locked position, the force flux element transforming linear motion of the actuator drive into rotational motion used to move the interlocking device, wherein the interlocking device shifts to the locked position at a middle position of the actuator drive between the two end positions thereof.

* * * * *